United States Patent [19]

Saeks et al.

[11] Patent Number: 5,083,729
[45] Date of Patent: Jan. 28, 1992

[54] STORAGE SYSTEM FOR HOLDING ATHLETIC EQUIPMENT AND A METHOD

[75] Inventors: Ford Saeks, Wichita, Kans.; John R. Howard, West Chicago; Charles E. Nichols, Woodridge, both of Ill.

[73] Assignee: Ford Saeks, Wichita, Kans.

[21] Appl. No.: 583,183

[22] Filed: Sep. 14, 1990

[51] Int. Cl.⁵ .................................................. A47F 7/00
[52] U.S. Cl. ....................................... 211/22; 211/17; 211/207; 248/200.1
[58] Field of Search ....................... 211/22, 17, 18, 107, 211/105.3, 207, 94, 162, 190, 193, 86; 248/200.1, 225.1, 188.5, 220.2, 354.4

[56] References Cited

U.S. PATENT DOCUMENTS

| | | | |
|---|---|---|---|
| 615,995 | 12/1898 | Leonard | 211/22 |
| 706,718 | 8/1902 | Bradbury | 211/22 |
| 2,961,212 | 11/1960 | Beal | 248/200.1 |
| 3,228,646 | 1/1966 | Hinrichs et al. | 248/200.1 X |
| 4,068,761 | 1/1978 | McCarthy | 248/200.1 X |
| 4,552,270 | 11/1985 | Lentz et al. | 211/22 X |
| 4,813,550 | 3/1989 | Saeks | 211/22 X |

FOREIGN PATENT DOCUMENTS

| | | | |
|---|---|---|---|
| 1273980 | 9/1961 | France | 211/207 |
| 2503654 | 10/1982 | France | 211/18 |
| 30002 | 12/1897 | United Kingdom | 211/22 |
| 316 | 1/1903 | United Kingdom | 211/22 |

Primary Examiner—Karen J. Chotkowski
Attorney, Agent, or Firm—John W. Carpenter

[57] ABSTRACT

A storage system for holding athletic equipment comprising a body member having a first side, a second side, a back opening, and an inside surface communicating with the back opening. The inside surface has a first and second inside arcuate surface respective in the first and second side of the body member. A pair of rib members is integrally bound to the inside surface of the body member. Each rib member has a rib lip protruding therefrom. The rib lip of each rib member protrudes towards each other such as to define a rib opening there between. A lower and upper height adjustment member is slidably disposed within the body member against the first and second inside arcuate surface. A first external channel member is connected to the first side and has a first channel opening, and a second external channel member is connected to the second side and has a second channel opening. A first bracket is slidably disposed in the first external channel for supporting and retaining athletic equipment, such as a bicycle, off a support surface, such as the floor. Similarly, a second bracket is slidably disposed within the second external channel for supporting and retaining athletic equipment off the support surface. A method for storing a bicycle.

23 Claims, 6 Drawing Sheets

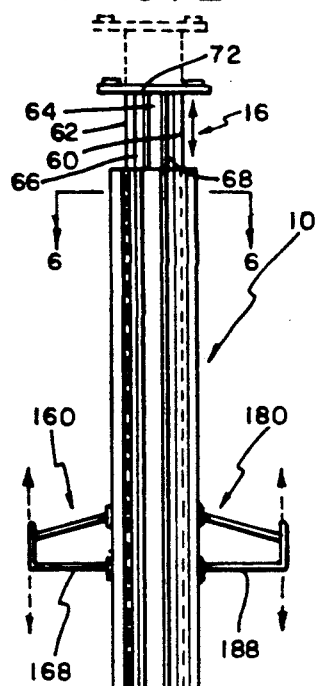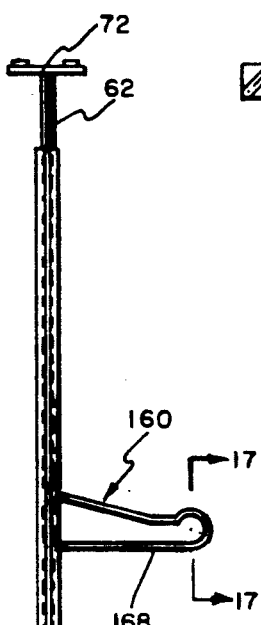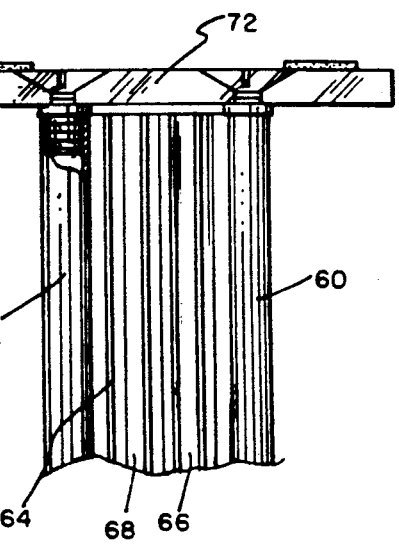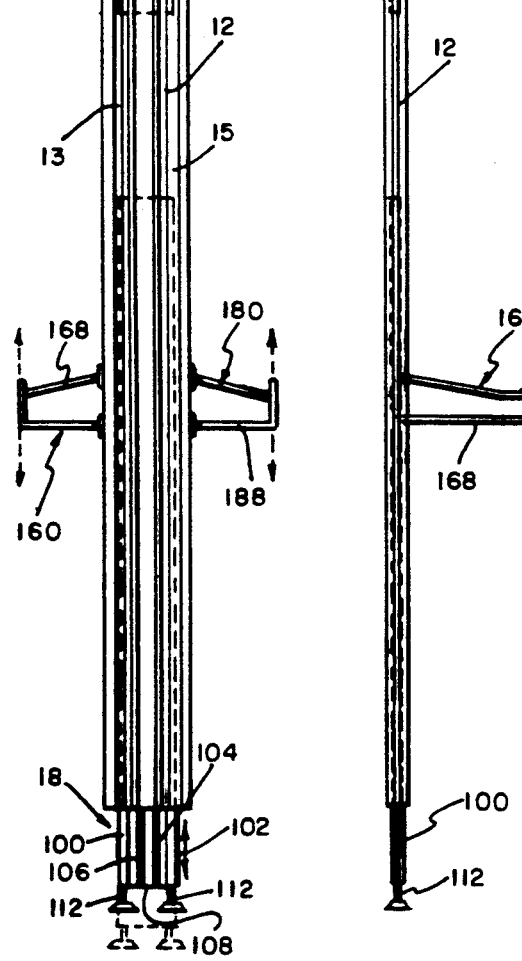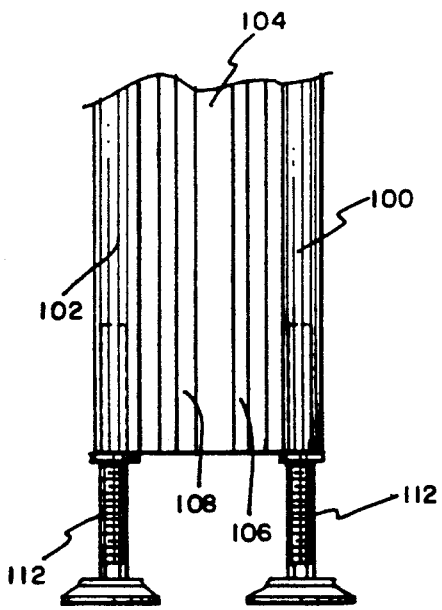

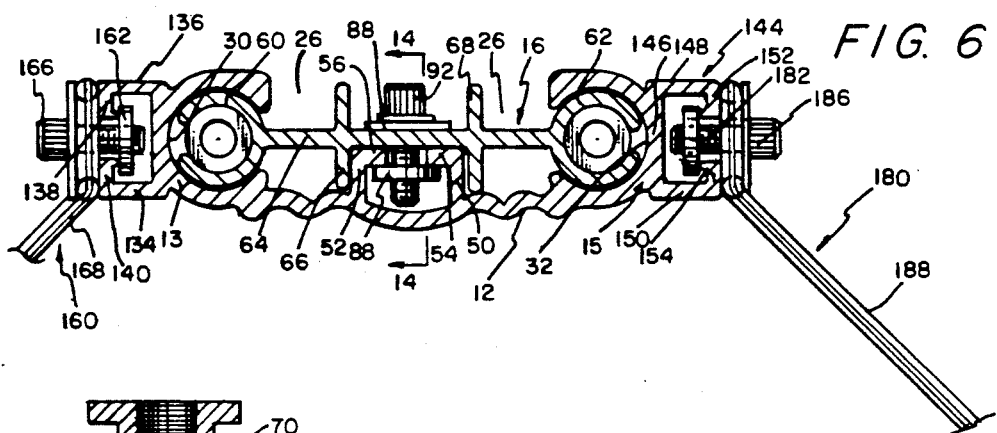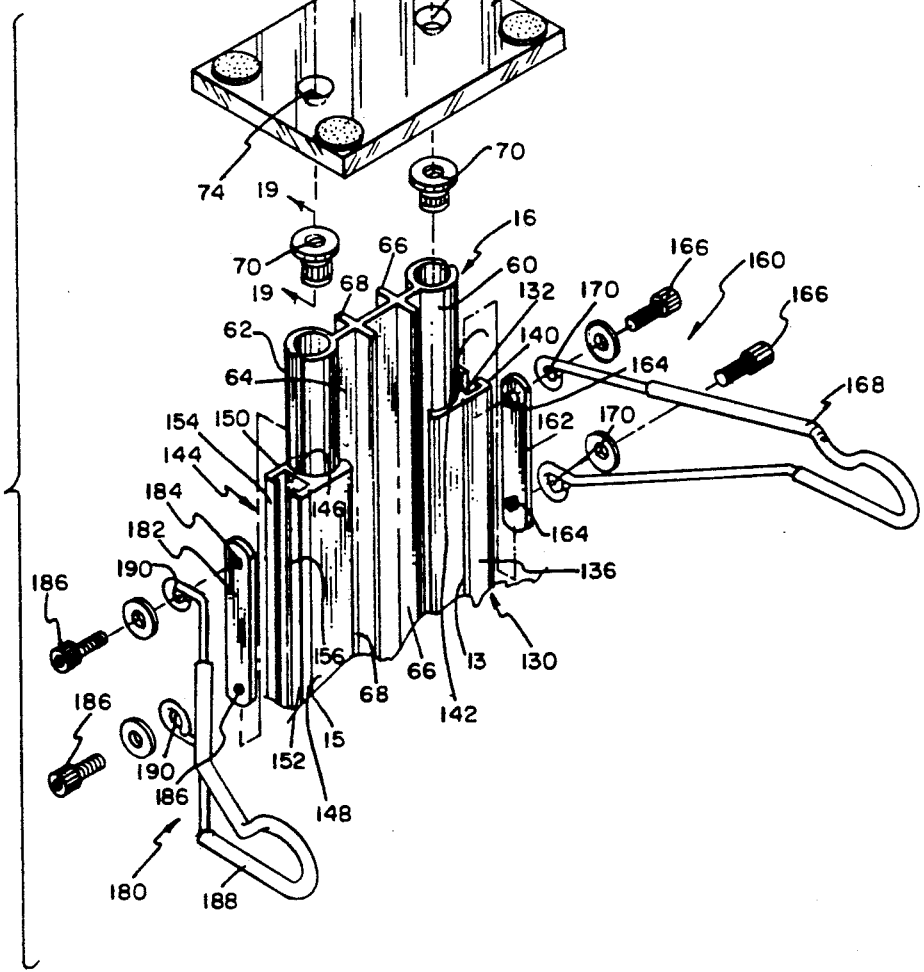

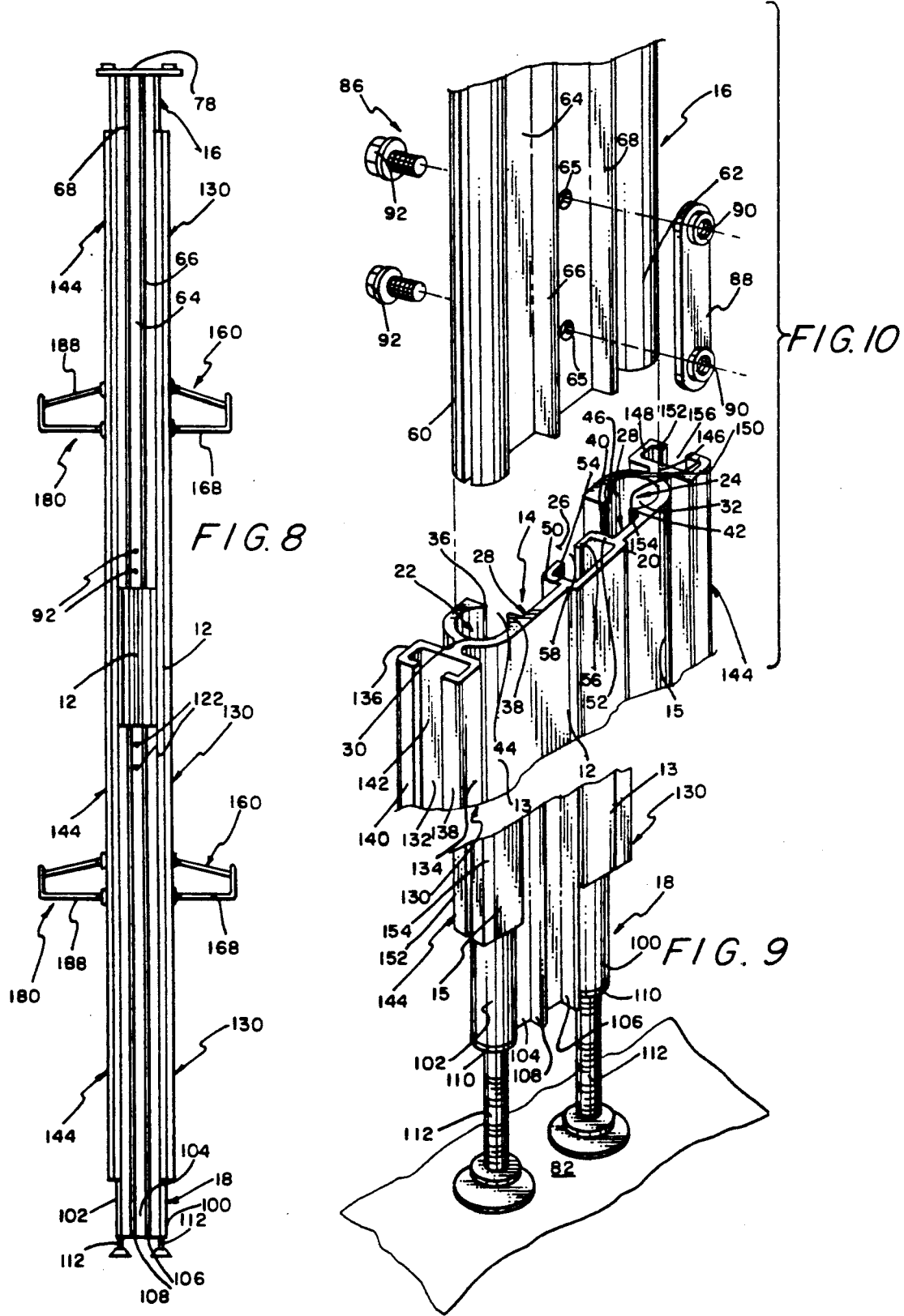

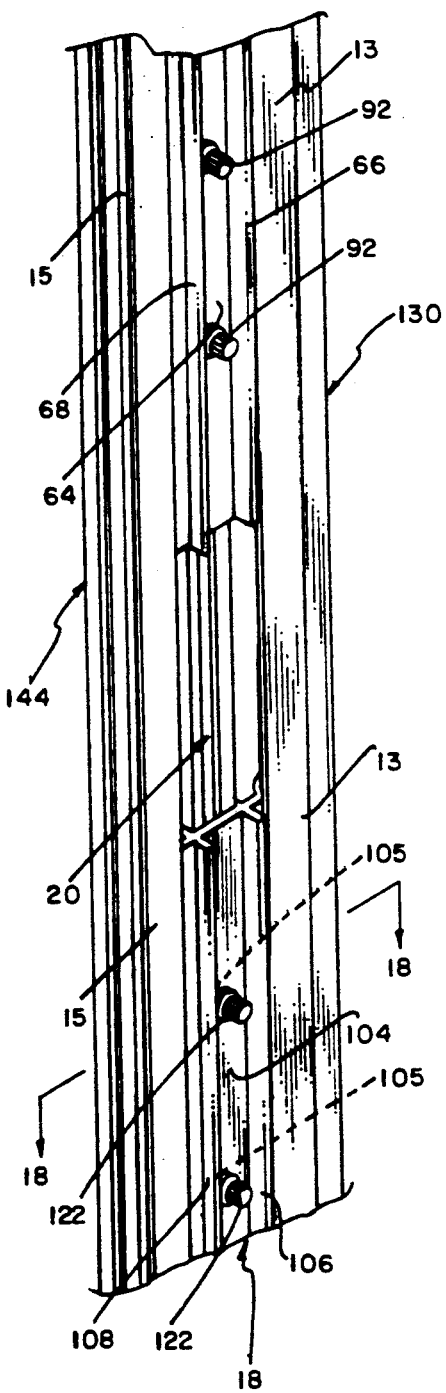
FIG. 11
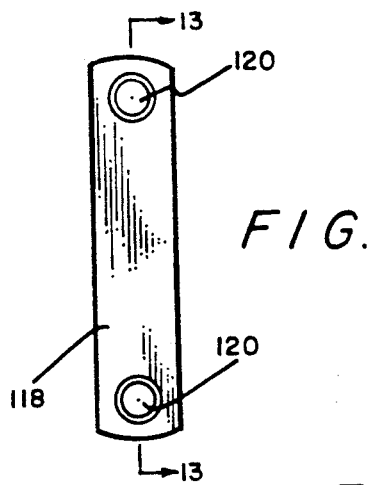
FIG. 12
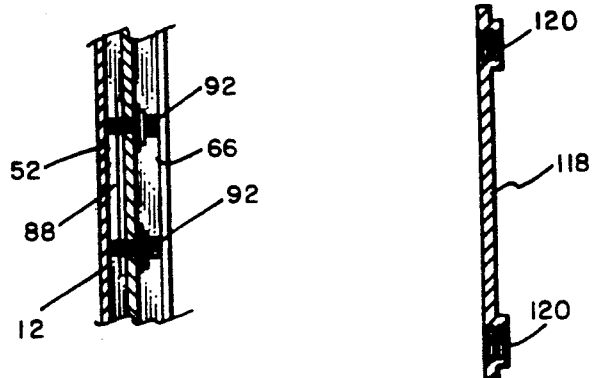
FIG. 13
FIG. 14
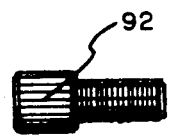
FIG. 15
FIG. 16
FIG. 17

STORAGE SYSTEM FOR HOLDING ATHLETIC EQUIPMENT AND A METHOD BACKGROUND OF THE INVENTION

1. Field of the Invention

The present invention relates to a storage system for holding athletic equipment. More specifically, the present invention provides a system for the storage of athletic equipment, such as bicycles, skis, and the like, and a method for storage a bicycle.

2. Description of the Prior Art

A patentability investigation was conducted and the following U.S. patents were discovered: U.S. Pat. No. 610,656 by Martin; U.S. Pat. No. 3,976,200 by Munns; U.S. Pat. No. 615,995 by Leonard; and U.S. Pat. No. 4,116,341 by Hebda. None of the foregoing prior art teaches or suggests the particular storage system and method of this invention.

SUMMARY OF THE INVENTION

The present invention broadly accomplishes its desired objects by broadly providing a storage system for holding athletic equipment and the like. The storage system includes a body member having a structure defining an internal channel means for slidably receiving an upper height adjustment member and a lower height adjustment member. At least one external channel member is secured to the body member for receiving at least one means for supporting and retaining athletic equipment off a support surface. An upper height adjustment member is slidably disposed within the internal channel means. Similarly, a lower height adjustment member is also slidably disposed within the internal channel means. The storage system also includes at least one means, slidably disposed in the at least one external channel member, for supporting and retaining athletic equipment off a support surface.

The present invention further accomplishes its desired objects by more specifically providing a storage system for holding athletic equipment and the like. The storage system has a body member having a first side and a second side, a back opening, and an inside surface communicating with the back opening. The inside surface has a first inside arcuate surface in the first side of the body member and a second inside arcuate surface in the second side of the body member. A first rib member is integrally bound to the inside surface of the body member and has a first rib lip protruding therefrom. A second rib member is integrally bound to the inside surface of the body member and has a second rib lip protruding therefrom in direction of the first rib lip such as to define a rib opening between the first rib lip and the second rib lip. The storage system further has an upper height adjustment member slidably disposed within the body member against the first inside arcuate surface and the second inside arcuate surface. A second height adjustment member is also slidably disposed within the body member against the first inside arcuate surface and the second arcuate surface. A first external channel member is connected to the first side and has a first channel opening. A second external channel member is connected to the second side and has a second channel opening. A first means, slidably disposed in the first external channel, is provided for supporting and retaining athletic equipment off a support surface. Also, a second means, slidably disposed in the second external channel, is provided for supporting and retaining athletic equipment off a support surface.

The present invention further broadly accomplishes its desired objects by broadly providing a method for storing a bicycle comprising the steps of:

(a) providing a body member having an internal channel means for slidably receiving an upper height adjustment member and a lower height adjustment member;

(b) securing a first external channel member to the first side of the body member and a second external channel member to a second side of the body member opposed to the first side;

(c) disposing slidably an upper height adjustment member within the internal channel means;

(d) disposing slidably a lower height adjustment member within the internal channel means;

(e) supporting the lower height adjustment member on a lower support surface;

(f) positioning at a first predetermined location in the first external channel member a first means for supporting and retaining a bicycle off a support surface;

(g) positioning at a second predetermined location in the second external channel member a second means for supporting and retaining a bicycle off a support surface wherein said second predetermined location in the second external channel member is closer to the lower support surface than the first predetermined location in the first external channel; and (h) placing a bicycle on the first and second means for supporting and retaining a bicycle off a support surface.

It is therefore an object of the present invention to provide a storage system for holding athletic equipment and the like, such as bicycles, skis and the like.

It is therefore another object of the present invention to provide a method for storing a bicycle.

These, together with the various ancillary objects and features which will become apparent to those skilled in the art as the following description proceeds, are attained by this novel apparatus and method for holding athletic equipment, a preferred embodiment being shown with reference to the accompanying drawings, by way of example only, wherein:

BRIEF DESCRIPTION OF THE DRAWINGS

FIG. 2 is a front elevational view of the apparatus for storing athletic equipment;

FIG. 3 is a side elevational view of the apparatus for storing athletic equipment;

FIG. 4 is a partial front elevational view disclosing part of the upper height adjustment member of the apparatus for storing athletic equipment;

FIG. 5 is a partial front elevational view of the lower height adjustment member of the apparatus for storing athletic equipment;

FIG. 6 is a partial horizontal view taken in direction of the arrows and along the plane of line 6—6 in FIG. 2;

FIG. 7 is an exploded, segmented partial perspective view of part of the height adjustment member disassembled, and the pair of bicycle holders disassembled with lines indicating the position of the various disassembled parts;

FIG. 8 is a vertical sectional view taken in direction of the arrows and along the plane of line 8—8 in FIG. 7;

FIG. 9 is a partial, exploded perspective view of the lower height adjustment member slidably disposed within the body member of the storage system, and supported at the bottom by a support surface;

FIG. 10 is a partial, exploded perspective view of the upper height adjustment member disassembled from the body member of the storage system, with arrows indicating the positions and the direction of insertion of the various disassembled elements;

FIG. 11 is a partial perspective view of part of the body member having slidably disposed therein the upper height adjustment member and the lower height adjustment member;

FIG. 12 is a front elevational view of the weld nut as employed to lock the lower height adjustment member in place within the body member;

FIG. 13 is a vertical sectional view taken in direction of the arrows and along the plane of line 13—13 in FIG. 12;

FIG. 14 is a vertical sectional view taken in direction of the arrows and along the plane of line 14—14 in FIG. 6;

FIG. 15 is a side elevational view of one of the bolts that is employed to engage the weldnut of FIG. 12;

FIG. 16 is a top plan view of the bolt of FIG. 15;

FIG. 17 is a vertical section of view taken in the direction of arrows and along the plane of line 17—17 in FIG. 3.

FIG. 19 is a vertical sectional view of an upper insert nut that is received in the hollow ends of the cylindrical upper hollow members.

DETAILED DESCRIPTION OF THE INVENTION

Figure 1:
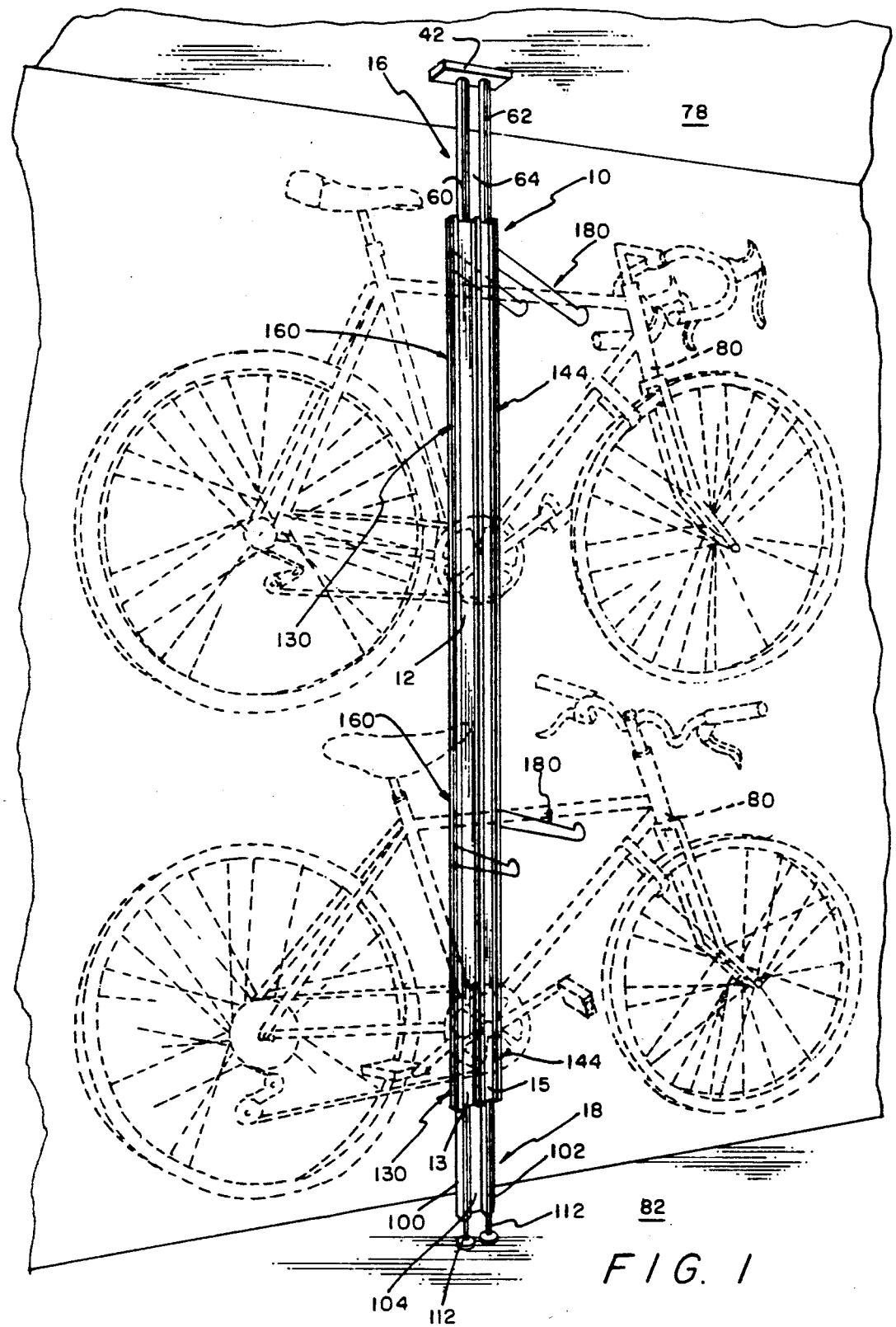
FIG. 1 is an exploded perspective view of the apparatus for storing athletic equipment or the like with a plurality of bicycles illustrated as dotted lines and mounted on the apparatus.

Referring in detail now to the drawings, wherein similar parts of the invention are identified by like reference numerals, there is seen a storage system, generally illustrated as 10, for holding athletic equipment such as bicycles or any other equipment. The storage system 10 comprises a hollow body member 12 functioning as a central support or stanchion. The body member 12 has opposed sides 13 and 15. The body member 12 is a generally hollow member broadly having a structure with an internal channel, generally illustrated as 14, for slidably receiving an upper height adjustment member, generally illustrated as 16, and a lower height adjustment member, generally illustrated as 18. The upper height adjustment member 16 is for contacting a ceiling 78 and the lower height adjustment member 18 is for contacting a floor 82, all in accordance with a procedure to be more fully explained hereinafter. The internal channel 14 generally, longitudinally extends through the entire structure of the body member 12. However, the spirit and scope of the present invention encompasses a partial extension of the internal channel 14 through the structure of the body member 12. The internal channel 14 includes a generally, central internal channel, generally illustrated as 20, and a pair of opposed side internal channels, generally illustrated as 22 and 24, positioned on opposite sides of the central internal channel 20, as best illustrated in FIG. 10. As further best illustrated in FIG. 10, the side internal channel 22 as in side 13 of the body member 12 and the side internal channel 24 as in side 15 of the body member 12.

The body member 12 has a back opening 26, and an inside surface, generally illustrated as 28, which forms the side internal channels 22 and 24 and part of the central internal channel 20. The inside surface 28 communicates with the back opening 26. More particularly, the inside surface 28 is generally continuous and terminates in the back opening 26. The back opening 26 communicates with the channels 20, 22 and 24. The inside surface 28 is formed with an inside arcuate (i.e., generally semi-circular or partially cylindrical) surface 30 in the side 13, and defines part of the side internal channel 22. The inside surface 28 is also formed with an inside arcuate (i e., generally semi-circular or partially cylindrical) surface 32 in the side 15 and defines part of the side internal channel 24. The side 13 and the inside arcuate surface 30 terminate in a lip 36. The inside arcuate surface 30 further terminates in a knob (or ridge) 38 integrally bound to the body member 12, more specifically to the inside surface 28 such as to form an opening 44 between the lip 36 and the knob 38. Similarly, the side 15 and the inside arcuate surface 32 terminate in a lip 40; and the inside arcuate surface 32 further terminates in a knob (or ridge) 42 integrally bound to the body member 12, more specifically to the inside surface 28, such as to form or provide an opening 46 between the lip 40 and the knob 42.

The central internal channel 20 is defined by a pair of rib members 50 and 52, each integrally bound to the body member 12, more specifically to the inside surface 28, and respectively having rib lips 54 and 56 protruding in direction of each other and terminating in a space to form a rib opening 58.

The upper height adjustment member 16 comprises a pair of generally cylindrical upper hollow members 60 and 62 which are interconnected by an upper support member 64. The upper support member 64 has a pair of apertures 65—65 as shown in FIG. 10. Integrally formed with the upper support member 64 and on each side thereof is a pair of upper support ribs 66 and 68 spaced a sufficient distance apart such that the rib members 50 and 52 can pass slidably between the support ribs 66 and 68. The upper height adjustment member 16 is slidably disposed broadly within the internal channel 14, more specifically within the side internal channels 22 and 24 such that cylindrical member 60 is slidably disposed against the inside arcuate surface 30, the cylindrical member 62 is slidably disposed against the inside arcuate surface 32, and the support member 64 passes slidably through the openings 44 and 46 while the inside surface of the upper support ribs 66 and 68 slidably contact the external surface of the rib members 50 and 52.

The hollow ends of the generally cylindrical upper hollow members 60 and 62 each receives an upper insert nut 70. A top plate 72 having apertures 74—74 is removably connected to the top ends of the generally cylindrical upper hollow members 60 and 62 by aligning the apertures 74—74 with the insert nuts 70—70 and passing screws 76—76 through the apertures 74 to threadably engage the upper insert nuts 70. The top plate 7 is for contacting a ceiling 78, and is generally flushed against the ceiling 78 when the storage system 10 is in an upright, vertical position for holding athletic equipment, such as a bicycle 80 (or any other equipment), as best illustrated in FIG. 1.

The upper height adjustment member 16 is fully capable of being slid up and down within the body member 12, more specifically within the opposed side internal channels 22 and 24, in or to firmly flush the top plate 72 against the ceiling 78 to assist in supporting the storage system 10 in an upright vertical position. The desired position or location of the upper height adjustment member 16 within the body member 12 will depend on the distance between the floor 82 and the ceiling 78. To maintain the storage system in the upright vertical position (see FIG. 1) and maintain the upper height adjustment member 16 at a desired location within the body member 12, the upper height adjustment member 16 is engaged by an upper nut/bolt assembly, generally illustrated as 86 in FIG. 10 which functions as a means for maintaining and affixing the upper height adjustment member 16 stationary and non-movable with respect to the body member 12 and while disposed within the side internal channels 22 and 24. The upper nut/bolt assembly 86 comprises an upper weldnut member 88 having a pair of end apertures 90—90 disposed at the extremities of the weldnut member 88, and a pair of bolts 92—92 (see FIG. 10). The bolts 92—92 pass through apertures 65—65 and threadably engages the apertures 90—90 of the upper weldnut member 88. The bolts 92—92 are not to be tightened down on weldnut member 88 until the upper height adjustment member 16 is slidably disposed within body member 12 which the weldnut member 88 is slidably disposed within the central internal channel 20 and engaged to the bolts 92—92. The bottom of upper height adjustment member 16 is aligned with the internal channel 14 such that the generally cylindrical hollow members 60 and 62 can slidably pass into the side internal channels 22 and 24, respectively, and the bolts 92—92 can pass through rib opening 58 while loosely engaged to the weldnut member 88 that is to be slidably disposed in the central internal channel 20. After the upper height adjustment member 16 has been aligned as such, it is passed into the body member 12, more specifically into the internal channel 14 of the body member 12, such that the following upper dispositions are occurring: the generally cylindrical upper hollow members 60 and 62 are respectively slidably disposed in the side internal channels 22 and 24 such that the external surfaces of the generally cylindrical upper member 60 is in slidable contact with the inside arcuate surface 30 and the generally cylindrical upper member 62 is in slidable contact with the inside arcuate surface 32; the upper support member 64 is slidably passing through openings 44 and 46; the inside surfaces of the upper support ribs 66 and 68 are in slidable contact with the outside surfaces of the rib members 50 and 52; the bolts 92—92, which are passing through apertures 65—65 and loosely, threaded engaged within the apertures 90—90 of the upper weldnut member 88, are also slidably passing through the rib opening 58; and the upper weldnut member 88, which is loosely, threadably engaged with the bolts 92—92 is slidably disposed within the central internal channel 20 such that the bottom surfaces of the rib lips 54 and 56 are in slidable contact with the planar surface of the upper weldnut member 88. After the upper height adjustment member 16 has been postured at a desired position within the internal channel 14 of the hollow body member 12 such that the top plate 78 is at a desired distance away from the top of the body member 12, the bolts 92—92 are screwed into the apertures 90—90 of the upper weldnut member 88 to move the upper weldnut member 88 towards the upper support member 64 and into frictional contact with the bottom surfaces of the rib lips 54 and 56. With sufficient tightening of the bolts 92—92, the rib lips 54 and 56 are firmly sandwiched between the upper support member 64 (i.e. that section of the upper support member 64 located between the upper support ribs 66 and 68) and the upper weldnut member 88; and there is sufficient frictional contact among the upper support member 64, the rib lips 54 and 56, and the upper weldnut member 88, especially between a planar surface of the upper weldnut member 88 and the bottom surfaces of the rib lips 54 and 56, that the upper height adjustment member 16 remains stationary with respect to the body member 12 while disposed within the hollow body member 12, more specifically within the side internal channels 22 and 24 of the body member 12 with no slippage.

Figure 18:
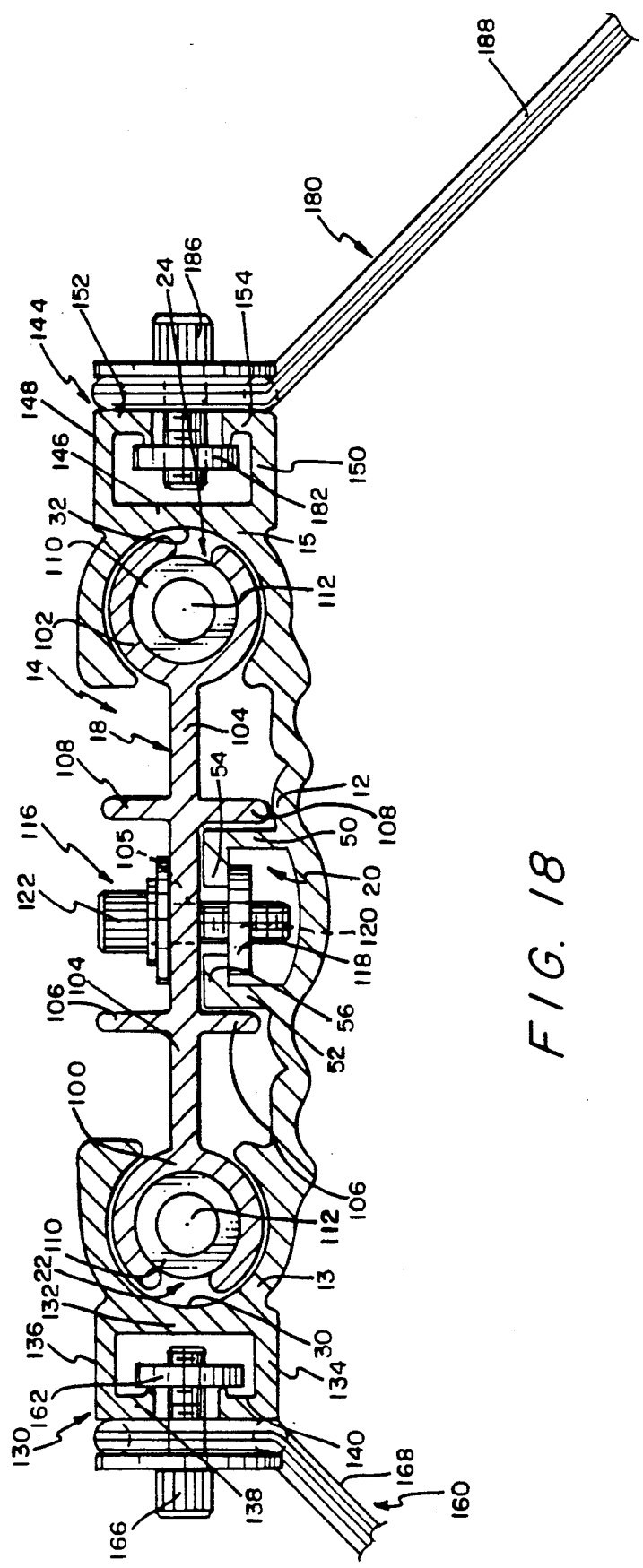
FIG. 18 is an enlarged horizonal sectional view taken in direction of the arrows and along the plane of line 18—18 in FIG. 11.

The lower height adjustment member 18 is basically identical to the upper height adjustment member 16 except a pair of threaded feet (which will be more fully identified below) replaces the top plate 72. The lower height adjustment member 18 passes into the hollow body member 12 through the lower end thereof. As best shown in FIGS. 9, 11 and 18, the lower height adjustment member 18 comprises a pair of generally cylindrical lower hollow members 100 and 102 which are interconnected by a lower support member 104 having a pair of apertures 105—105, aligned over each other like apertures 65—65. Integrally formed with the lower support member 104 and on each side thereof is a pair of lower support ribs 106 and 108 spaced a sufficient distance apart such that the rib members 50 and 52 can pass slidably between the lower support ribs 106 and 108. The lower height adjustment member 18 is slidably disposed broadly within the internal channel 14, more specifically within the side internal channels 22 and 24 such that cylindrical lower member 100 is slidably disposed against the inside arcuate surface 30, the cylindrical lower member 102 is slidably disposed against the inside arcuate surface 32, and the lower support member 104 passes slidably through the openings 44 and 46 while the inside surface of the support ribs 106 and 108 slidably contact the external surface of the rib members 50 and 52.

The generally cylindrical hollow members 100 and 102 have hollow lower ends for receiving lower insert nuts 110—110. Threaded engaged with the insert nuts 110—110 are threaded feet 112—112 which are for contacting the floor 82 (i.e. the support surface) and serves to level the storage system 10 when it is in the upright, vertical position for holding a bicycle 80.

The lower height adjustment member 18 is fully capable of being slid up and down within the body member 12, more specifically within the opposed side internal channels 22 and 24, in order to firmly flush the threaded feet 112—112 against the floor 82 to assist in supporting the storage system 10 in an upright vertical position. The desired position or location of the lower height adjustment member 18 within the body member 12 will depend on the distance between the floor 82 and the ceiling 78 to maintain the storage system in the upright vertical position (see FIG. 1) and maintain the lower height adjustment member 18 at a desired location within the body member 12, the lower height adjustment member 18 is engaged by a lower nut/bolt assembly, generally illustrated as 116 in FIG. 18, which is identical to upper nut/bolt assembly 86 and functions as a means for maintaining and affixing the lower height adjustment member 18 stationary and non-movable with respect to the body member 12 and while disposed within the side internal channels 22 and 24. The lower nut/bolt assembly 116 comprises a lower weldnut member 118 having a pair of end apertures 120—120 disposed at the extremities of the weldnut member 118, and a pair of bolts 122—122 (see FIGS. 11 and 12). The bolts 122—122 pass through apertures 105—105 and threadably engages the apertures 120—120 of the lower weldnut member 118. The bolts 122—122 are not to be tightened down on weldnut member 118 until the lower height adjustment member 18 is slidably disposed within body member 12 which the lower weldnut member 118 is slidably disposed within the central internal channel 20 and engaged to the bolts 122—122. The top of lower height adjustment member 18 is aligned with the internal channel 14 such that the generally cylindrical hollow members 100 and 102 can slidably pass into the side internal channels 22 and 24, respectively, and the bolts 122—122 can pass through rib opening 58 while loosely engaged to the lower weldnut member 118 that is to be slidably disposed in the central internal channel 20. After the lower height adjustment member 18 has been aligned as such, it is passed into the body member 12, more specifically into the internal channel 14 of the body member 12 such that the following lower dispositions are occurring: the generally cylindrical lower hollow members 100 and 102 are respectively slidably disposed in the side internal channels 22 and 24 such that the internal surfaces of the generally cylindrical lower member 100 is in slidable contact with the inside arcuate surface 30 and the generally cylindrical lower member 102 is in slidable contact with the inside arcuate surface 32; the lower support member 104 is slidably passing through openings 44 and 46; the inside surfaces of the lower support ribs 106 and 108 are in slidable contact with the outside surfaces of the rib members 50 and 52; the bolts 122—122, which are passing through apertures 105—105 and loosely, threaded engaged within the apertures 120—120 of the lower weldnut member 118, are also slidably passing through the rib opening 58; and the lower weldnut member 118, which is loosely, threadably engaged with the bolts 122—122 is slidably disposed within the central internal channel 20 such that the bottom surfaces of the rib lips 54 and 56 are in slidable contact with the planar surface of the lower weldnut member 118. After the lower height adjustment member 18 has been postured at a desired position within the internal channel 14 of the hollow body member 12 such that the threaded feet 112—112 are at a desired distance away from the bottom of the body member 12, the bolts 122—122 are screwed into the aperture 120—120 of the lower weldnut member 118 to move the lower weldnut member 118 towards the lower support member 104 and in frictional contact with the bottom surfaces of the rib lips 54 and 56. As was seen with the tightening of bolts 92—92 of the upper nut/bolt assembly 86, with sufficient tightening of the bolts 122—122, the rib lips 54 and 56 are firmly sandwiched between the lower support member 104 (i.e. that section of the lower support member 10 located between the lower support ribs 106 and 108) and the lower weldnut member 118; and there is sufficient frictional contact among the lower support member 104, the rib lips 54 and 56, and the lower weldnut member 118, especially between a planar surface of the lower weldnut member 118 and the bottom surfaces of the rib lips 54 and 56, that the lower height adjustment member 18 remain stationary with respect to the body member 12 while disposed within the hollow body member 12, more specifically within the side internal channels 22 and 24 of the body member 12 with no slippage.

An external channel member generally illustrated as 130, is connected, preferably integrally bound, to the side 13 of the hollow body member 12. The channel member 130 comprises a channel support 132, and a pair of opposed channel sides 134-136 bound to the channel support 132. Channel sides 134 and 136 respectively have integrally formed therewith channel lips 138 and 140 that protrude towards each other and terminate in a space to form a channel opening 142.

Another or a second external channel member, generally illustrated as 144, is also bound to the hollow body member 12, more specifically to the side 15 of the body member 12. Channel member 144 is identical to channel member 130 by having a channel support 146, a pair of opposed channel sides 148 and 150 bound to the channel support 146, and channel lips 152 and 154 formed integrally with the channel sides 148 and 150, respectively. Similar to channel lips 138 and 140, channel lips 152 and 154 protrude towards each other and terminate in a space to form a channel opening 156.

Slidably disposed in external channel member 130 is a bracket assembly, generally illustrated as 160, for supporting and retaining athletic equipment, such as a bicycle 80, off a support surface (i.e. the floor 82). Bracket assembly 160 comprises a weldnut member 162 having a pair of apertures 164—164 disposed at the extremities thereof, and a pair of screws 166—166 (see FIG. 7). The bracket assembly 160 further comprises a bracket 168 which is formed with a pair of eyelets 170—170 wherethrough the screws 166—166 pass to threadably engage the apertures 164—164 of the weldnut member 162. The screws 166—166 are not to be tightened into the weldnut 162 until the weldnut member 162 is slidably disposed within the external channel member 130, more specifically within the space encompassed by channel support 132, the pair of opposed channel sides 134-136, and the protruding channel lips 138 and 140. The screws 166—166 pass through eyelets 170—170 and loosely engage threadably the apertures 164—164 of the weldnut member 162. The weldnut member 162 is then aligned with the top opening of the external channel member 130, and subsequently slid into the space encompassed by channel support 132, the channel sides 134-136 and the protruding channel lips 138 and 140, with the shanks of the screws 166—166 passing slidably through the channel opening 142 and with the structure of the bracket 168 forming the eyelets 170—170 in slidable contact with the outside surface of the channel lips 138 and 140. After the bracket 168 (including the associated weldnut member 162 that is slidably disposed within the external channel member 130) have been moved to a desired position within the external channel member 130 and at a desired position away from the floor 82, the screws 166—166, while passing through channel opening 142, are screwed into the apertures 164—164 of the weldnut member 162 to move the weldnut member 162 towards the bracket 168 (especially towards the structure of the bracket 168 defining the eyelets 170—170) and into frictional contact with the bottom surfaces of the channel lips 138 and 140. With sufficient tightening of the screws 166—166, the channel lips 138 and 140 become firmly sandwiched and compressed between the structure of the bracket 168 especially forming the eyelets 170—170 and the weldnut member 162; and there is sufficient frictional contact among the weldnut member 162, the channel lips 138 and 140 and the structure of the bracket 168 forming the eyelets 170—170 (especially between the planar surface of the weldnut member 162 and the bottom surfaces of the channel lips 138 and 140) that the bracket assembly 160 remains stationary with respect to the body member 12 while engaged to the external channel member 130; more specifically while the weldnut member 162 is in frictional contact with the bottom surfaces of the channel lips 138 and 140 and threadably engaged to the screws 166—166 which are passing through the channel opening 142 and compressing the structure of the bracket 168 forming the eyelets 170—170 against the outside surfaces of the channel lips 138 and 140.

Slidably disposed in external channel member 144 is a bracket assembly, generally illustrated as 180 in FIG. 7, for supporting and retaining athletic equipment (i.e. a bicycle 80) off the floor 82 or any other support surface. Bracket assembly 180 is essentially identical to bracket assembly 160 and operates and functions independent thereof such that bracket assembly 180 may be positioned higher or lower than bracket assembly 160, which is ideal when a ladies bicycle 80 (see lower bicycle 80 in FIG. 1) is to be supported off the floor 82. Bracket assembly 180 comprises a weldnut member 182 having a pair of apertures 184—184 disposed at the extremities thereof, and a pair of screws 186—186 (see FIG. 7). The bracket assembly 180 further comprises a bracket 188 which is formed with a pair of eyelets 190—190 wherethrough the screws 186—186 pass to threadably engage the apertures 184—184 of the weldnut member 182. The screws 186—186 are not to be tightened into the weldnut 182 until the weldnut member 182 is slidably disposed within the external channel member 144, more specifically within the space encompassed by channel support 146, the pair of opposed channel sides 148-150, and the protruding channel lips 152 and 154. The screws 186—186 pass through eyelets 190—190 and loosely engage threadably the apertures 184—184 of the weldnut member 182. The weldnut member 182 is then aligned with the top opening of the external channel member 144, and subsequently slid into the space encompassed by channel support 146, the channel sides 148-150 and the protruding channel lips 152 and 154, with the shanks of the screws 186—186 passing slidably through the channel opening 156 and with the structure of the bracket 188 forming the eyelets 190—190 in slidable contact with the outside surface of the channel lips 152 and 154. After the bracket 188 (including the associated weldnut member 182 that is slidably disposed within the external channel member 144) have been moved to a desired position within the external channel member 144 and at a desired position away from the floor 82, the screws 186—186, while passing through channel opening 156, are screwed into the apertures 184—184 of the weldnut member 182 to move the weldnut member 182 towards the bracket 188 (especially towards the structure of the bracket 188 defining the eyelets 190—190) and into frictional contact with the bottom surfaces of the channel lips 152 and 154. With sufficient tightening of the screws 186—186, the channel lips 152 and 154 become firmly sandwiched and compressed between the structure of the bracket 188 especially forming the eyelets 190—190 and the weldnut member 182; and there is sufficient frictional contact among the weldnut member 182, the channel lips 152 and 154 and the structure of the bracket 188 forming the eyelets 190—190 (especially between the planar surface of the weldnut member 182 and the bottom surfaces of the channel lips 152 and 154) that the bracket assembly 180 remains stationary with respect to the body member 12 while engaged to the external channel member 144; more specifically while the weldnut member 182 is in frictional contact with the bottom surfaces of the channel lips 152 and 154 and threadably engaged to the screws 186—186 which are passing through the channel opening 156 and compressing the structure of the bracket 188 forming the eyelets 190—190 against the outside surfaces of the channel lips 152 and 154.

Continuing to refer in detail to the drawings for operation of the invention, the storage system 10 is to be mounted at any location having an overhead support surface (i.e. the ceiling 78) and a lower support surface (i.e. the floor 82). It is preferred that the distance between the overhead support surface and the lower support surface be estimated to provide an indication of the amount of extension from the body member 12 needed for the upper height adjustment member 16 and the lower height adjustment member 18. For a six foot body member 12 and for an eight foot ceiling 78, both the upper and lower height adjustment member 16 and 18 have to be extended about one foot. The upper height adjustment member 16 is initially assembled by passing the bolts 92—92 through apertures 65—65 and loosely threaded in apertures 90—90 of the weldnut member 88 such that the distance between the upper support member 64 and the weldnut member 88 is sufficient to pass the rib lips 54 and 56 therebetween. The lower height adjustment member 18 is similarly assembled; that is, the bolts 122—122 are initially passed through apertures 105—105 and subsequently loosely threaded into apertures 120—120 of the weldnut member 118 such that the distance between the lower support member 104 and the weldnut member 118 can accommodate the rib lips 54 and 56. The upper height adjustment member 16 is subsequently passed into the internal channels 22 and 24 of the body member 12 such that, as previously indicated, the following dispositions are occurring with respect to the upper height adjustment member 16 and the upper part of the body member 12: (a) the generally cylindrical upper hollow members 60 and 62 are respectively slidably disposed in the side internal channels 22 and 24 such that the external surfaces of the generally cylindrical upper member 60 is in slidable contact with the inside arcuate surface 30 and the generally cylindrical upper member 62 is in slidable contact with the inside arcuate surface 32; (b) the upper support member 64 is slidably passing through openings 44 and 46; (c) the inside surfaces of the upper support ribs 66 and 68 are in slidable contact with the outside surfaces of the rib members 50 and 52; (d) the bolts 92—92, which are passing through apertures 65—65 and loosely threaded engaged in the apertures 90—90 of the upper member 88, are also slidably passing through the rib opening 58; and (e) the upper weldnut member 88, is slidably disposed within the central internal channel 20 such that the bottom surfaces of the rib lips 54 and 56 are in slidable contact with the planar surface of the upper weldnut member 88; that is, the rib lips 54 and 56 are slidably positioned between the upper weldnut member 88 and the upper support member 64. After the upper height adjustment member 16 has been disposed at a desired position within the internal channel 14 of the hollow body member 12 such that the top plate 78 is at a desired distance (e.g. 1 foot) away from the top of the body member 12, the bolts 92—92 are screwed into the aperture 90—90 of the upper weldnut member 88 to move the upper weldnut member 88 towards the upper support member 64 and into frictional contact with the bottom surface of the rib lips 54 and 56. With sufficient tightening of the bolts 92—92, the rib lips 54 and 56 are firmly sandwiched between the upper support member 64 and the upper weldnut member 88. The bolts 92—92 are continually tightened until there is sufficient frictional contact among the upper support member 64, the rib lips 54 and 56, and the upper weldnut member 88 that the upper height adjustment member 16 remains stationary with respect to the body member 12 while disposed within the hollow body member 12.

The lower height adjustment member 18 is similarly assembled and disposed within the body member 12, but though the bottom of the body member 12 and not through the top. More specifically, the lower height adjustment member 16 is passed into the internal channels 22 and 24 of the body member 12 from and/or through the bottom thereof such that, as was previously mentioned, the following dispositions are occurring with respect to the lower height adjustment member 18 and the lower part of the body member 12: (a) the generally cylindrical lower hollow member 100 and 102 are respectively slidably disposed in the side internal channels 22 and 24 such that the external surfaces of the generally cylindrical lower member 100 is in slidable contact with the inside arcuate surface 30 and the generally cylindrical lower member 102 is in slidable contact with the inside arcuate surface 32; (b) the lower support member 104 is slidably passing through opening 44 and 46; (c) the inside surfaces of the lower support ribs 106 and 108 are in slidable contact with the outside surfaces of the rib members 50 and 52; (d) the bolts 122—122, which are passing through apertures 105—105 and loosely, threaded engaged within the apertures 120—120 of the lower weldnut member 118, are also slidably passing through the rib opening 58; and (e) the lower weldnut member 118 is slidably disposed within the central internal channel 20 such that the bottom surfaces of the rib lips 54 and 56 are in slidable contact with the planar surface of the lower weldnut member 118; that is the rib lips 54 and 56 are slidably positioned between the lower weldnut member 118 and the lower support member 104. After the lower height adjustment member 18 has been disposed at a desired position within the internal channel 14 of the hollow body member 12 such that the threaded feet 112—112 are at a desired distance (e.g. 1 foot) away from the bottom of the body member 12, the bolts 122—122 are screwed into the apertures 120—120 of the lower weldnut member 118 to move the lower weldnut member 118 towards the lower support member 104 and in frictional contact with the bottom surface of the rib lips 54 and 56. As was previously mentioned concerning the tightening of bolts 92—92 of the upper nut/bolt assembly 86, with sufficient tightening of the bolts 122—122, the rib lips 54 and 56 are firmly sandwiched between the lower support member 104 and the lower weldnut member 118; the bolts 122—122 are continued to be tightened until there is sufficient frictional contact among the lower support member 104, the rib lips 54 and 56, and the lower weldnut member 118 that the lower height adjustment member 18 remains stationary with respect to the body member 12 while disposed within the internal channel 14.

The body member 12 including the associated, affixed upper and lower height adjustment member 16 and 18 is subsequently positioned between the upper support surface (i.e. the ceiling 78) and the lower support surface (i.e. the floor 82) such that the top plate 72 is in very close proximity to the upper support surface and the threaded feet 112—112 are supported by the lower support surface. If the top plate 72 is not completely flushed against the upper support surface, the threaded feet 112—112 may be screwed out to further extend the length of the lower height adjustment member 18 and the overall length of the body member 12 (and the affixed adjustment member 16 and 18), and cause the top plate 72 to become completely flushed against the upper support surface.

One or more bracket assemblies 160 may be slidably positioned and affixed within the external channel member 130. Similarly, one or more bracket assemblies 180 may be slidably disposed and affixed within the external channel member 144. The bracket assemblies 160 and 180 may be positioned such that two pairs of bracket assemblies 160 and 180 are facing forward of the body member 12 to hold two bicycles 80—80 and two pairs are facing rearward of the body member 12 to hold another two bicycles 80—80, making a total of four bicycles 80 being held off of the floor 82. As previously indicated, one bracket assembly 160 may be positioned at a smaller or shorter distance from the floor 82 that one of the corresponding opposed bracket assemblies 180 (as best shown in FIG. in order to facilitate accommodation of a ladies bicycle 80 (see lower bicycle 80 in FIG. 1).

The bracket assembly 160 is initially assembled by passing screws 166—166 through the eyelets 170—170 of bracket 168 and threadably engaging loosely apertures 164—164 of weldnut member 162 such that the distance between weldnut member 162 and the eyelets 170—170 is sufficient to pass lips 138 and 140 therebetween. The bracket assembly 180 is similarly assembled; therebetween. The bracket assembly 180 is similarly assembled; that is, the screws 186—186 are initially passed through the eyelets 190—190 of the bracket 188 and subsequently loosely threaded into apertures 184—184 of the weldnut member 182 such that the distance between the eyelets 190—190 and the weldnut member 182 can accommodate the lips 152 and 154.

The bracket assembly 160 is slidably disposed into the external channel member 130 by initially aligning the weldnut member 162 with the top (or bottom) opening of the external channel member 130, and subsequently sliding the weldnut member 162 into the space encompassed by channel support 132, the channel sides 134-136 and the protruding channel lips 138 and 140, with the shanks of the screws 166—166 passing slidably through the channel opening 142 and with the structure of the bracket 168 forming the eyelets 170—170 in slidable contact with the outside surface of the channel lips 138 and 140. After the bracket 168 (including the associated weldnut member 162 that is slidably disposed within the external channel) member 130) have been moved to a desired position within the external channel member 130 and at a desired position away from the floor 82, the screws 166—166, while passing through channel opening 142, are screwed into the apertures 164—164 of the weldnut member 162 to move the weldnut member 162 towards the bracket 168 and into frictional contact with the bottom surfaces of the channel lips 138 and 140. With sufficient tightening of the screws 166—166, the channel lips 138 and 140 become firmly sandwiched and compressed between the structure of the bracket 168 forming the eyelets 170—170 and the weldnut member 162. The screws 166—166 are continued to be tightened until there is sufficient frictional contact among the weldnut member 162, the channel lips 138 and 140 and the structure of the bracket 168 forming the eyelets 170—170 such that the bracket assembly 160 remains stationary with respect to the body member 12 while engaged to the external channel member 130.

The bracket assembly 180 is similarly disposed within the external channel member 144. More specifically, the weldnut member 182 is aligned with the top opening of the external channel member 144, and subsequently slid into the space encompassed by channel support 146, the channel sides 148 and 150 and the protruding channel lips 152 and 154, with the shanks of the screws 186—186 passing slidably through the channel opening 156 and with the structure of the bracket 188 forming the eyelets 190—190 in slidable contact with the outside surface of the channel lips 152 and 154. After the bracket 188 (including the associated weldnut member 182 that is slidably disposed within the external channel member 144) have been moved to a desired position within the external channel member 144 and at a desired position away from the floor 82, the screws 186—186, while passing through channel opening 156, are screwed into the aperture 184—184 of the weldnut member 182 to move the weldnut member 182 towards the bracket 188 and into frictional contact with the bottom surfaces of the channel lips 152 and 154. With sufficient tightening of the screws 186—186, the channel lips 152 and 154 become firmly sandwiched and compressed between the structure of the bracket 188 forming the eyelets 190—190 and the weldnut member 182. The screws 186—186 are continued to be tightened until there is sufficient frictional contact among the weldnut member 182, the channel lips 152 and 154 and the structure of the bracket 188 forming the eyelets 190—190 such that the bracket assembly 180 remains stationary with respect to the body member 12 while engaged to the external channel member 144.

As previously mentioned the bracket assemblies 160 and 180 are independently positioned respectively within the external channel members 130 and 144 and at any distance from the ceiling 78 or the floor 82. Disposition of a bracket assembly 160 at different distance from the ceiling 78 or the floor 82 than a bracket 180 provides a system for maintaining a ladies bicycle 80 off the floor 82.

While the present invention has been described her in with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

What is claimed is:

1. A storage system for holding athletic equipment and the like comprising:

a body member having a structure defining an internal channel means for slidably receiving an upper height adjustment member and a lower height adjustment member;

at least one external channel member secured to said body member for securing at least one means for supporting and retaining athletic equipment off a support surface;

an upper height adjustment member slidably disposed within the internal channel means;

a lower height adjustment member slidably disposed within the internal channel means; and at least one means, slidably disposed in said at least one external channel member, for supporting and retaining athletic equipment off a support surface; and said internal channel means comprises a first internal channel and a pair of opposed second internal channels positioned on opposite sides of said first internal channel.

2. The storage system of claim 1 additionally comprising an upper means engaged to the upper height adjustment member for affixing the upper height adjustment member to the body member such that the upper height adjustment member can remain stationary with respect to the body member while disposed within said internal channel means of said body member.

3. The storage system of claim 2 wherein said upper height adjustment member has at least one upper aperture; and said upper means for affixing the upper height adjustment member to the body member comprises a nut member slidably disposed in said first internal channel and a screw member rotatably passing through said upper aperture and threadably engaging said nut member.

4. The storage system of claim 1 additionally comprising a lower means engaged to the lower height adjustment member for affixing the lower height adjustment member to the body member such that the lower height adjustment member can remain stationary with respect to the body member while disposed within said internal channel means of said body member.

5. The storage system of claim 4 wherein said lower height adjustment member has at least one lower aperture; and said lower means for affixing the lower height adjustment member to the body member comprising a nut member slidably disposed in said first internal channel and a screw member rotatably passing through said lower aperture and threadably engaging said nut member.

6. The storage system of claim 1 comprising a first external channel and a second external channel both secured to said body member on opposite sides thereof such that said first external channel and said second external channel are in an opposed relationship with respect to each other.

7. The storage system of claim 6 wherein said at least one means, slidably disposed in said at least one external channel member, for supporting and retaining athletic equipment off a support surface comprises a first means, slidably disposed in said first external channel member, for supporting and retaining athletic equipment off a support surface; and a second means, slidably disposed in said second external channel member, for supporting and retaining athletic equipment off a support surface.

8. The storage system of claim 7 wherein said first means for supporting and retaining athletic equipment comprises a first nut member slidably disposed in the first external channel member, a first holder member, and a first screw member that couples the first holder member to the first nut member.

9. The storage system of claim 8 wherein said second means for supporting and retaining athletic equipment comprises a second nut member slidably disposed in the second external channel member, a second holder member, and a second screw member that couples the second holder member to the second nut member.

10. The storage system of claim 1 wherein said body member has a structure additionally defining an opening communicating with said first internal channel and with said pair of opposed second internal channels.

11. A storage system for holding athletic equipment and the like comprising:
- a body member having a first side and a second side, a back opening, and an inside surface communicating with the back opening, said inside surface having a first inside arcuate surface in the first side of the body member and a second inside arcuate surface in the second side of the body member;
- a first rib member integrally bound to the inside surface of the body member and having a first rib lip protruding therefrom;
- a second rib member integrally bound to the inside surface of the body member and having a second rib lip protruding therefrom in direction of the first rib lip such as to define a rib opening between the first rib lip and the second rib lip;
- an upper height adjustment member slidably disposed within the body member against the first inside arcuate surface and the second inside arcuate surface;
- a lower height adjustment member slidably disposed within the body member against the first inside arcuate surface and the second inside arcuate surface;
- a first external channel member connected to the first side and having a first channel opening;
- a second external channel member connected to the second side and having a second channel opening;
- a first means, slidably disposed in the first external channel, for supporting and retaining athletic equipment off a support surface; and
- a second means, slidably disposed in the second external channel, for supporting and retaining athletic equipment off a support surface.

12. The storage system of claim 11 additionally comprising an upper means engaged to the upper height adjustment member and passing through the rib opening for positioning the upper height adjustment member at a desired location within the body member and against the first arcuate surface and the second arcuate surface side that the upper height adjustment member can remain stationary with respect to the body member while disposed within the body member and against the first arcuate surface and the second arcuate surface.

13. The storage system of claim 12 wherein said upper means for positioning the upper height adjustment member at a desired location within the body member comprises a nut member slidably disposed against the first rib lip and the second rib lip and a screw member rotatably passing through the upper height adjustment member and threadably engaging the nut member.

14. The storage system of claim 11 additionally comprising a lower means engaged to the lower height adjustment member and passing through the rib opening for positioning the lower height adjustment member at a desired location within the body member and against the first arcuate surface and the second arcuate surface such that the lower height adjustment member can remain stationary with respect to the body member while disposed within the body member and against the first arcuate surface and the second arcuate surface.

15. The storage system of claim 14 wherein said lower means for positioning the lower height adjustment member at a desired location within the body member comprises a nut member slidably disposed against the first rib lip and the second rib lip and a screw member rotatably passing through the lower height adjustment member and threadably engaging the nut member.

16. The storage system of claim 11 wherein said first side of the body member terminates in a first side lip and said first inside arcuate surface terminates in a first knob member integrally bound to the body member such as to form a first body opening between the first side lip and the first knob member; and said second side of the body member terminates in a second side lip and said second inside arcuate surface terminates in a second knob member integrally bound to the body member such as to form a second body opening between the second side lip and the second knob member.

17. The storage system of claim 16 wherein said upper height adjustment member comprises a first upper generally cylindrical member slidably disposed against the first inside arcuate surface, a second upper generally cylindrical member slidably disposed against the second inside arcuate surface, and an upper support member connected to said first upper generally cylindrical member and to said second upper generally cylindrical member and slidably passing through said first body opening and said second body opening.

18. The storage system of claim 16 wherein said lower height adjustment member comprises a first lower generally cylindrical member slidably disposed against the first inside arcuate surface, a second lower generally cylindrical member slidably disposed against the second inside arcuate surface, and an lower support member connected to said first lower generally cylindrical member and to said second lower generally cylindrical member and slidably passing through said first body opening and said second body opening.

19. The storage system of claim 11 wherein said first means for supporting and retaining athletic equipment off a support surface comprises a first nut member slidably disposed in the first external channel member, a first holder member, and a first screw member that couples the first holder member to the first nut member and passes through the first channel opening.

20. The storage system of claim 19 wherein said second means for supporting and retaining athletic equipment off a support surface comprises a second nut member slidably disposed in the second external channel member, a second holder member, and a second screw member that couples the second holder member to the second nut member and passes through the second channel opening.

21. The storage system of claim 11 additionally comprising a pair of threaded foot means secured rotatably to the lower height adjustment member for supporting the lower height adjustment member off a support surface, and a top plate member secured to the upper height adjustment member.

22. A method for storing a bicycle comprising the steps of:
(a) providing a body member having an opening and an internal channel means communicating with the opening and for slidably receiving an upper height adjustment member and a lower height adjustment member;

(b) securing a first external channel member to the first side of the body member and a second external channel member to a second side of the body member opposed to the first side;

(c) disposing slidably on upper height adjustment member within the internal channel means;

(d) disposing slidably a lower height adjustment member within the internal channel means;

(e) supporting the lower height adjustment member on a lower support surface;

(f) positioning at a first predetermined location in the first external channel member a first means for supporting and retaining a bicycle off a support surface;

(g) positioning at a second predetermined location in the second external channel member a second means for supporting and retaining a bicycle off a support surface wherein said second predetermined location in the second external channel member is closer to the lower support surface than the first predetermined location in the first external channel; and (h) placing a bicycle on the first and second means for supporting and retaining a bicycle off a support surface.

23. The method for storing of claim 22 additionally comprising contacting an upper support surface with the upper height adjustment member.

* * * * *